(12) United States Patent
Meling et al.

(10) Patent No.: US 11,137,103 B2
(45) Date of Patent: Oct. 5, 2021

(54) SUBSEA PIG LAUNCHERS

(71) Applicant: Subsea 7 Norway AS, Stavanger (NO)

(72) Inventors: Torstein Meling, Tananger (NO); Oivind Stangeland, Sandnes (NO); William Tobias Bird, Hafrsfjord (NO)

(73) Assignee: Subsea 7 Norway AS, Stavanger (NO)

(*) Notice: Subject to any disclaimer, the term of this patent is extended or adjusted under 35 U.S.C. 154(b) by 0 days.

(21) Appl. No.: 16/966,593

(22) PCT Filed: Feb. 5, 2019

(86) PCT No.: PCT/EP2019/052782
§ 371 (c)(1),
(2) Date: Jul. 31, 2020

(87) PCT Pub. No.: WO2019/154809
PCT Pub. Date: Aug. 15, 2019

(65) Prior Publication Data
US 2020/0363003 A1     Nov. 19, 2020

(30) Foreign Application Priority Data
Feb. 6, 2018 (GB) .................................. 1801907

(51) Int. Cl.
*F16L 55/46* (2006.01)
*B08B 9/055* (2006.01)

(52) U.S. Cl.
CPC ............ *F16L 55/46* (2013.01); *B08B 9/0551* (2013.01)

(58) Field of Classification Search
CPC ......... F16L 55/46; B08B 9/055; B08B 9/0551

USPC .................................................... 15/104.062
See application file for complete search history.

(56) References Cited

U.S. PATENT DOCUMENTS

| | | | |
|---|---|---|---|
| 3,125,116 A | 3/1964 | Schaberg | |
| 4,401,133 A * | 8/1983 | Lankston | ............... B08B 9/055 137/268 |
| 4,709,719 A | 12/1987 | Littleton et al. | |
| 5,139,576 A | 8/1992 | Davis | |
| 5,884,656 A | 3/1999 | Smith | |
| 5,913,637 A | 6/1999 | Rajabali et al. | |
| 6,022,421 A | 2/2000 | Bath et al. | |
| 6,428,241 B1 | 8/2002 | Stracke et al. | |

(Continued)

FOREIGN PATENT DOCUMENTS

| | | |
|---|---|---|
| EP | 0 866 258 | 9/1998 |
| GB | 2497701 | 6/2013 |

(Continued)

*Primary Examiner* — Laura C Guidotti
(74) *Attorney, Agent, or Firm* — Levy & Grandinetti (57) ABSTRACT

A multiple pig launcher includes a tubular structure along which a series of pipeline pigs may be advanced in stepwise fashion to be launched into a pipeline in succession. A launching station holds a first pig at a downstream end of the series in readiness for launch. A pig stopper mechanism is operable selectively to hold a second pig at a holding station upstream of the launching station when launching the first pig and to release the second pig from the holding station to be advanced into the launching station after the first pig has been launched. The pig stopper mechanism comprises at least one radially movable gripper element that can apply radially inward gripping force to a pig held at the holding station.

31 Claims, 4 Drawing Sheets

(56) References Cited

U.S. PATENT DOCUMENTS

| | | | |
|---|---|---|---|
| 6,475,294 B2 * | 11/2002 | McCanna | ............... B08B 9/055 |
| | | | 134/8 |
| 6,533,032 B1 | 3/2003 | Seixas et al. | |
| 8,296,894 B2 | 10/2012 | Watson et al. | |
| 8,752,229 B2 | 6/2014 | Archer et al. | |
| 8,800,587 B2 | 8/2014 | Breuer et al. | |
| 2002/0059687 A1 | 5/2002 | Smith et al. | |
| 2002/0170599 A1 | 11/2002 | Disher et al. | |
| 2013/0212820 A1 | 8/2013 | Burns et al. | |

FOREIGN PATENT DOCUMENTS

| | | |
|---|---|---|
| KR | 1020150086639 | 7/2015 |
| NO | 319203 | 6/2005 |

* cited by examiner

SUBSEA PIG LAUNCHERS

This invention relates to subsea pig launchers. In particular, the invention relates to the challenges of storing and successively launching multiple pigs used for maintenance, inspection or other operations performed on a subsea pipeline.

Oil and gas pipelines transport multiphase fluids that tend to leave solid deposits on the tubular internal wall of the pipeline. Such deposits may comprise sand, muds, hydrates, waxes and/or condensates of asphaltene. As they thicken over time, these deposits can restrict fluid flow along the pipeline and may even, eventually, block it. A subsea pipeline blockage can of course be extremely disruptive; remedying it can be very complex and expensive.

As a subsea pipeline typically has a working life of about twenty years, it is necessary to clean deposits from the bore of the pipeline from time to time. A common way of doing so is pigging, that is, to propel a pig along the pipeline. Pigs may also be used for flushing, dewatering, pressure-testing or inspecting a pipeline from within.

Pigs may have various shapes of circular cross-section, such as spheres, cylinders or dumbbells. Their outer diameter is selected to be substantially equal to the inner diameter of the pipeline in question. Thus, a pig is a close sliding or interference fit within and against the interior of the pipeline.

In use, pigs are injected into and propelled along a pipeline by fluid pressure. Specifically, a pressure differential is created within the pipeline between a volume ahead of the pig and a volume behind the pig, with respect to the intended direction of travel. Thus, a pig is driven along a pipeline from a pig launcher, or trap, to a pig receiver by a pressure differential in the pipeline between upstream and downstream sides of the pig.

To maintain the necessary pressure differential, a pig has a series of annular or disc-shaped circumferential seals that separate the volume within the pipeline ahead of the pig from the volume within the pipeline behind the pig. The seals are suitably stiff enough to provide a scraping action so as to clean and flush the interior of the pipeline as the pig moves along the pipeline.

Bi-directional pigs can be shuttled along a pipeline in opposed reciprocal directions. Such pigs therefore have seals that are arranged to maintain adequate sealing contact with the interior of a pipeline irrespective of the direction of travel of the pig along the pipeline.

Most conveniently, the desired pressure differential is created by introducing high-pressure fluid through a pressure inlet into a volume behind the pig, initially within a pig launcher and then, after injection, within the pipeline. Thus, a pig launcher propels pigs into and along a pipeline with the relevant pressure differential.

A pig launcher comprises a section of pipe or tubing defining a chamber for housing one or more pigs. That chamber is supplied with high-pressure fluid through pressure inlets controlled by valves, connected to one or more pressurising lines known in the art as 'kick lines'. The chamber communicates with the interior of the pipeline through an access opening that is normally disposed at an end of the pipeline but, in principle, could be anywhere along the length of the pipeline.

Where there is only one pig, a pig launcher must be reloaded with another pig after each pig is launched. This requires repeatedly opening an end cap of the pig launcher, which may contain pressurised fluid, and so is impractical for subsea use. For this reason, it is desirable for a subsea pig launcher to contain two or more pigs and to make provision for those pigs to be launched successively and separately into and along a pipeline when required. In particular, multiple kick lines may be provided to launch the pigs successively when required.

It is impractical to leave a pig launcher in situ underwater for the full working life of a subsea pipeline. Thus, pig launchers are removed from a pipeline periodically to enable them to be reloaded and maintained and then to be reinstalled or re-used elsewhere.

Removing and reinstalling a subsea pig launcher is potentially complicated, time-consuming and therefore expensive as it requires the support of lifting vessels and intervention by divers or remotely-operated vehicles (ROVs). It is therefore desirable for a subsea pig launcher to contain as many pigs as possible.

The state of the art of subsea multiple pig launchers is to house several pigs in a horizontal or vertical tube, ready to be launched. Features are also provided to facilitate removal and reinstallation of the unit.

Examples of vertical multiple pig launchers are disclosed in U.S. Pat. Nos. 6,022,421 and 6,428,241. For instance, the multiple pig launcher of U.S. Pat. No. 6,022,421 comprises a vertical pipe section that holds a succession or train of pigs in series and is supplied with high-pressure fluid through various valves and pressure inlets. U.S. Pat. No. 6,022,421 employs a rocking arm comprising a fork that moves to hold and release the next pig in the magazine. However, such a fork is not optimally reliable and could jam the pig train.

U.S. Pat. No. 5,913,637 discloses a vertical multiple pig launcher in which the next pig to be launched is retained by a pneumatic actuation system that employs fingers to retain the pig. However this system may not be effective to retain all of the pigs of the storage magazine.

U.S. Pat. No. 319,203 discloses a method of launching single pigs from a launcher fitted with multiple pigs; however this design requires the use of an individual valve for each pig to be launched. Furthermore, prevention of uncontrolled launching relies on the pigs being retained in place by friction between the pig and the internal wall of the launcher. This is unreliable.

U.S. Pat. No. 5,884,656 shows a vertical multiple pig launcher in which each pig within the launcher is retained by a latch member. The pig launcher also has a flow control valve that controls fluid flow into the pig launcher. The flow control valve and the latch member may be actuated simultaneously to launch a single pig out of the pig launcher.

U.S. Pat. No. 3,125,116 describes an alternative apparatus for launching and extracting spherical pigs from pipelines.

U.S. Pat. No. 6,596,089 teaches a way of reloading a pig launcher subsea by coupling it to a rack carried by an ROV.

As an alternative, U.S. Pat. No. 8,800,587, US 2002/0170599 and U.S. Pat. No. 6,533,032 disclose vertical multiple pig launchers that comprise multiple storage barrels mounted in parallel. Once a barrel has been emptied of pigs, it is replaced by a loaded barrel. However, the multi-barrel system makes it complex to manage changes between barrels while ensuring sufficient water-tightness.

U.S. Pat. No. 8,296,894 shows that systems for pressurising and launching pigs are more complex in a horizontal multiple pig launcher. Vertical pig launchers are preferred because gravity simplifies launching. Thus, releasing a latch or opening a valve frees the first pig, which can then run into the pipeline with minimal extra pressure.

In GB 2497701, pigs are stored in a magazine between a piston and a spring that aligns the next pig with the pipeline. The magazine is transverse to the pipeline and therefore may require a large support structure.

Pig launchers may be obviated by a closed pigging loop, as exemplified by KR 20150086639. However this requires an injection and retrieval zone because the loop itself is not retrievable to the surface. A further drawback of a closed loop is that numerous pressure injection and relief lines are necessary to drive the pigs.

U.S. Pat. No. 8,752,229 describes a compact pig launcher for multiple pigs. It teaches arranging the storage magazine as a curve in a vertical plane. A vertical plane is selected for simplifying vertical connection to the pipeline. A drawback of this layout is the need for extra pressure to propel a pig upwards into the magazine before launching it.

Against this background, the present invention resides in a multiple pig launcher that comprises a tubular structure along which a series of pipeline pigs may be advanced stepwise in a downstream direction to be launched into a pipeline in succession. The launcher comprises: a launching station arranged to hold a first pig at a downstream end of the series in readiness for launch; a holding station upstream of the launching station in the tubular structure; and a pig stopper mechanism that is operable selectively to hold a second pig at the holding station when launching the first pig and to release the second pig from the holding station to be advanced into the launching station after the first pig has been launched. The pig stopper mechanism comprises at least one radially-movable gripper element that is arranged to apply radially-inward gripping force to a pig held at the holding station.

Advantageously, the pig stopper mechanism is operable to reduce the internal diameter of the tubular structure at the holding station. For example, there may be an angularly-spaced array of gripper elements that surround the holding station.

The or each gripper element is suitably fixed longitudinally with respect to the holding station. To improve engagement with an elongate pig, a plurality of gripper elements are preferably spaced longitudinally with respect to each other along the holding station.

The or each gripper element may be moved radially inwardly by a camming action applied to it by an associated longitudinally-movable cam formation. Conversely, the or each gripper element may move radially outwardly by virtue of its resilience upon being released by the cam formation.

Preferably, an angularty-spaced array of the cam formations is disposed around the tubular structure at the holding station. Similarly, a plurality of cam formations may be spaced longitudinally with respect to each other along the holding station.

The or each cam formation is suitably supported for said longitudinal movement by a longitudinally-movable actuator. Preferably the actuator is annular and surrounds the holding station. For example, the actuator may comprise a piston that is movable longitudinally along the tubular structure. In that case, the cam formations are conveniently supported by a sleeve that is fixed to the piston and that extends longitudinally beyond the piston.

The or each gripper element may comprise a free end that faces in the downstream direction, movable radially relative to an opposed radially-fixed root end. For example, the or each gripper element may comprise a finger that is supported by a pipe extending along the holding station. In that case, the or each finger may be integral with the pipe and may be defined by cut-outs extending through a wall of the pipe.

Conveniently, the launching station is arranged to hold the first pig by frictional engagement. For example, the launching station may comprise a tube whose internal diameter is less than an external diameter of a pig. Similarly, the tube may taper internally in the downstream direction.

A pusher may be arranged to apply force in the downstream direction to a pig at an upstream end of the series, to advance the or each remaining pig in the downstream direction after the first pig has been launched. For example, the pusher may comprise a deadweight that is movable under its weight along the tubular structure. Alternatively, the pusher may comprise a piston or a fluid injection system.

A pig magazine may be disposed upstream of, and in communication with, the holding station.

Preferably, the pig stopper mechanism is arranged simultaneously to engage at least two successive sealing discs along the length of a pig in the launcher.

The inventive concept embraces a corresponding method of launching a series of pipeline pigs into a pipeline in succession. That method comprises: holding a first pig at a downstream end of the series at a launch position in readiness for launch; and by selective application and release of radially-inward gripping force, holding a second pig of the series immediately upstream of the first pig when launching the first pig and then releasing the second pig to be advanced into the launch position after the first pig has been launched.

The first pig is suitably held by a frictional engagement that is overcome, on launch, by kicker fluid pressure.

The second pig may be advanced, when released, by applying pusher force behind the second pig.

Gripping force is preferably applied to the second pig only transiently, in response to a command to launch the first pig.

Preferably, gripping force is applied to the second pig from at least two mutually-opposed radial directions, and more preferably at two or more locations spaced along that pig.

In the prior art, launching individual pigs from a pig launcher containing multiple pigs is normally done by fitting a valve behind each pig. Where pigs are launched by remote control, control signals have to be provided to each valve to allow each pig to be launched individually.

The present invention allows individual pigs to be launched using a single valve by providing a pig stopper mechanism that prevents unwanted launch of other pigs in the launcher.

Embodiments of the invention provide a multiple pig launcher, comprising:
  a magazine for storing at least two pigs, the magazine comprising a barrel and a pushing system; and
  a launch unit comprising an interface with the main pipeline, a barrel and a kicker line that provides fluid pressure behind the first pig engaged in the launch unit;
  wherein the launch unit comprises:
    an inner barrel whose diameter is smaller than the diameter of pig sealing discs so that friction of the discs holds the pigs in position inside the inner barrel against external forces, and
    a pig gripper unit.

The magazine may be capable of being reloaded subsea or may be removable for reloading.

The multiple pig launcher is preferably substantially vertical in use, and preferably extends along a substantially vertical axis. When oriented vertically, the storage space of the launcher can be arranged as a straight or curved pipe to maximise the number of storable pigs within a given volume. More generally, the magazine may comprise a straight barrel, a curved barrel or a revolving or otherwise indexable multi-barrel system.

The pushing system of the magazine may comprise a deadweight, a piston or a pressurised fluid.

The inner barrel suitably has bores through which pressurised fluid may enter the inner barrel and propel the first pig.

The pig gripper unit may comprise: a slips piston that can reciprocate inside the barrel, for example by moving up and down if the barrel is upright; a slips sleeve functionally connected to and axially displaced with the slips piston; and at least one slips finger that is radially displaced through the inner barrel by the motion of the slips sleeve and that prevents axial movement of at least one pig located inside the inner barrel. The slips piston is suitably actuated hydraulically.

In order that the invention may be more readily understood, reference will now be made, by way of example, to the accompanying drawings, in which.

The drawings show a subsea pig launcher 10 that comprises a tubular external barrel divided into two sections, namely an upper barrel section 12 and a lower barrel section 14 that are joined together in mutual alignment by a flanged coupling 16. The upper barrel section 12 and the lower barrel section 14 are radially enlarged, both internally and externally, where they join around the coupling 16.

In this example, the launcher 10 contains a total of four pigs 18 disposed in end-to end contact in a straight longitudinal series that extends along and between the upper and lower barrel sections 12, 14. A leading pig 18 at the lower end of the series, positioned within the lower barrel section 14, is to be launched first. The remaining, trailing pigs 18 above the leading pig 18 are to be launched successively after the leading pig 18.

Downward movement of the pigs 18 toward a ready-to-launch position is driven by a deadweight 20 that is a sliding fit within the upper barrel section 12. The deadweight 20 serves as a pusher that acts on the series of pigs 18 through the last pig 18 of that series.

The upper barrel section 12 therefore serves as a magazine to provide storage space for multiple pigs 18 before they are advanced downwardly in stepwise manner to be launched individually in succession after the immediately preceding pig 18. In this simple embodiment of the invention, the upper barrel section 12 is generally straight and extends along a substantially vertical axis. However, other shapes, orientations and arrangements are possible to store a greater number of pigs 18 within a given space.

The upper end of the upper barrel section 12 is closed and sealed by a closure 22. Conveniently, the closure 22 supports a lifting point 24 that enables the pig launcher 10 to be suspended from a winch or crane of a support vessel when being installed or recovered.

Preferably, as shown, the closure 22 is removable to facilitate reloading the pig launcher 10 with pigs 18. The pig launcher 10 may be reloaded when installed underwater or may be recovered to the surface to be reloaded.

As is conventional, a side-mounted kicker line 26 communicates with the lower barrel section 14 to admit fluid under high pressure under control of a valve (not shown) when it is required to launch the leading pig 18 from the pig launcher 10. The lower barrel section 14 terminates at its lower end in a flange 28 for connection to a pipeline (not shown) that will receive the leading pig 18 through an access opening once launched.

The lower barrel section 14 contains a tubular inner barrel 30 fixed in concentric relation. The inner barrel 30 serves as a launching station to hold the leading pig 18 in place until high-pressure fluid is injected into the lower barrel section 14 through the kicker line 26 to launch that pig 18. For this purpose, the internal diameter of the inner barrel 30 is slightly smaller than the external diameter of the resilient sealing discs 32 that encircle the pig 18. The inner barrel 30 may also be coned internally, being slightly wider at the top than at the bottom. This means that, before launching, the leading pig 18 is retained in position in the lower barrel section 14 by friction between the sealing discs 32 of the pig 18 and the internal surface of the inner barrel 30.

The aforementioned internal radial enlargement of the upper barrel section 12 and the lower barrel section 14 defines a cylindrical recess within which a tubular slips piston 34 can slide for reciprocal longitudinal movement. The slips piston 34 extends upwardly from the lower barrel section 14 into the upper barrel section 12. The slips piston 34 forms part of, and drives the operation of, a pig stopper mechanism that, selectively, holds the second pig 18. The second pig 18 is thereby held at a holding station positioned immediately above the leading pig 18 in the aforementioned launching station defined by the inner barrel 30.

In this example, reciprocal movement of the slips piston 34 is driven hydraulically by introducing pressursed hydraulic fluid alternately through longitudinally-spaced inlets 36 that penetrate a wall of the lower barrel section 14. The inlets 36 communicate with respective annular cavities between the slips piston 34 and the lower barrel section 14.

Reciprocal movement of the slips piston 34 along the longitudinal axis of the pipe launcher 10 drives corresponding reciprocal movement of a tubular slips sleeve 38 that is fixed to the slips piston 34. In this example, the slips sleeve 38 is mounted to a radially inner side of the slips piston 34 and extends axially in opposed directions beyond the slips piston 34.

A slips pipe 40 is disposed concentrically within the slips piston 34 and the slips sleeve 38. The slips pipe 40 is fixed longitudinally with respect to the upper and lower barrel sections 12, 14, such that the slips piston 34 and the slips sleeve 38 surrounding the slips pipe 40 move reciprocally together along and relative to the slips pipe 40.

The slips pipe 40 has an oversized internal diameter, by say 105 to 110%, relative to the external diameter of the pigs 18 as defined by their sealing discs 32. Thus, the trailing pigs 18 are a loose sliding fit within the slips pipe 40, which protects their sealing discs 32 from distortion and allows them to drop easily toward the leading pig 18 under gravity and the effect of the deadweight 20 above.

The tubular wall of the slips pipe 40 is penetrated by elongate, generally U-shaped slits that define a circumferential array of resilient, longitudinally-extending, angularly-spaced segments or fingers 42. Free ends of the fingers 42 face in the direction of movement of the pigs 18 through the launcher 10, in this example downwardly. Conversely, the opposite ends of the fingers 42, in this example their upper ends, join integrally with the body of the slips pipe 40.

The slips sleeve 38 has a circumferential array of inclined pins that protrude radially inwardly to define ramp or cam formations 44. The cam formations 44 protrude inwardly beyond the outer diameter of the slips pipe 40. Each cam formation 44 is arranged to bear against a wedge surface on a radially outer side of a respective finger 42 of the slips pipe 40, defined where the free end of the finger 42 tapers radially inwardly in a downward direction.

Figure 3:
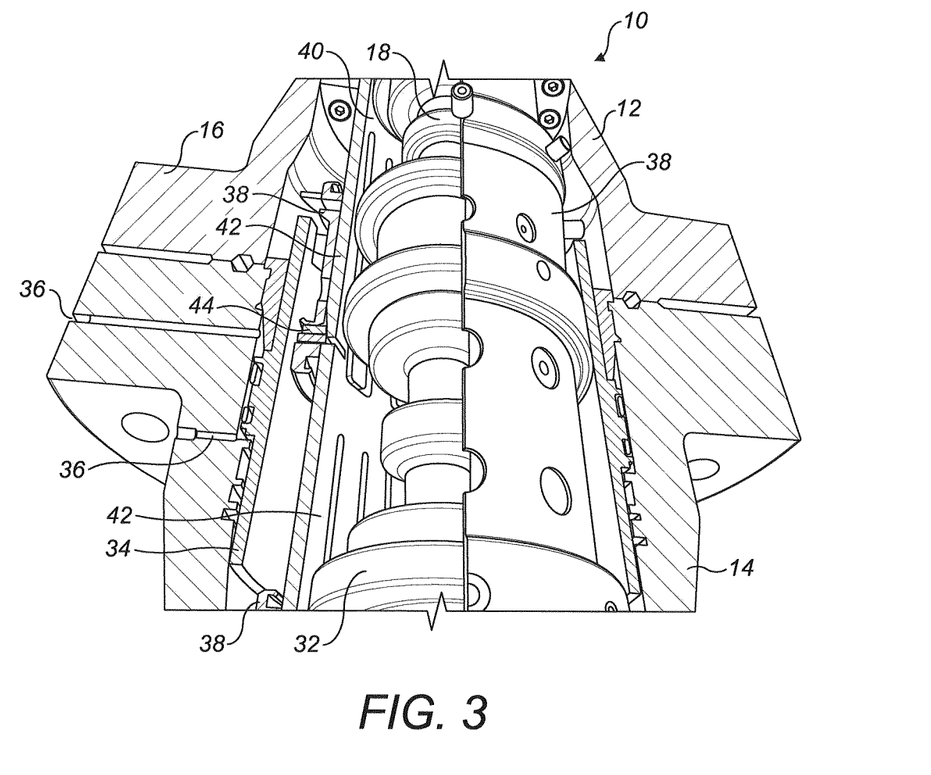
FIG. 3 is a further enlarged perspective view of the pig stopper mechanism as shown in FIGS. 1 and 2.
Figure 4:
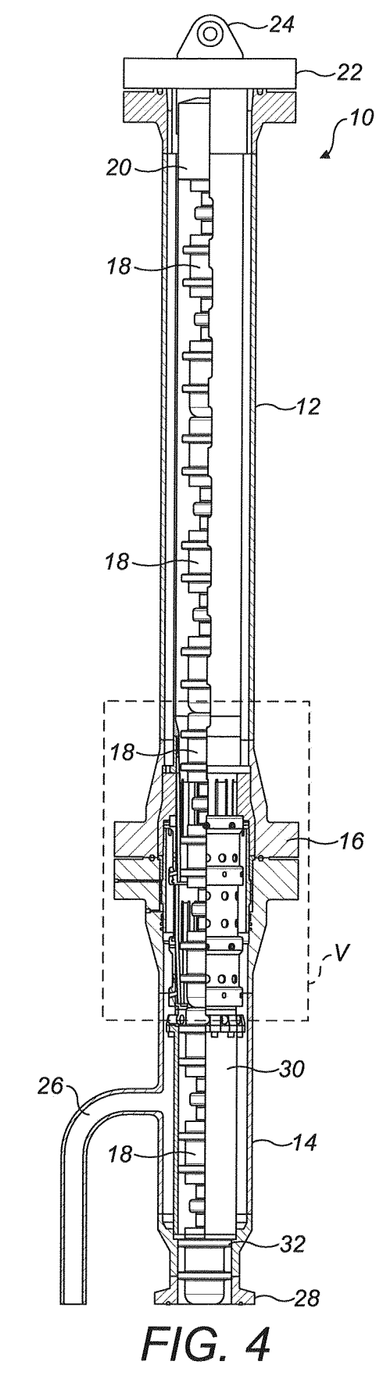
FIG. 4 corresponds to FIG. 1 but shows the pig stopper mechanism in a closed state.
Figure 5:
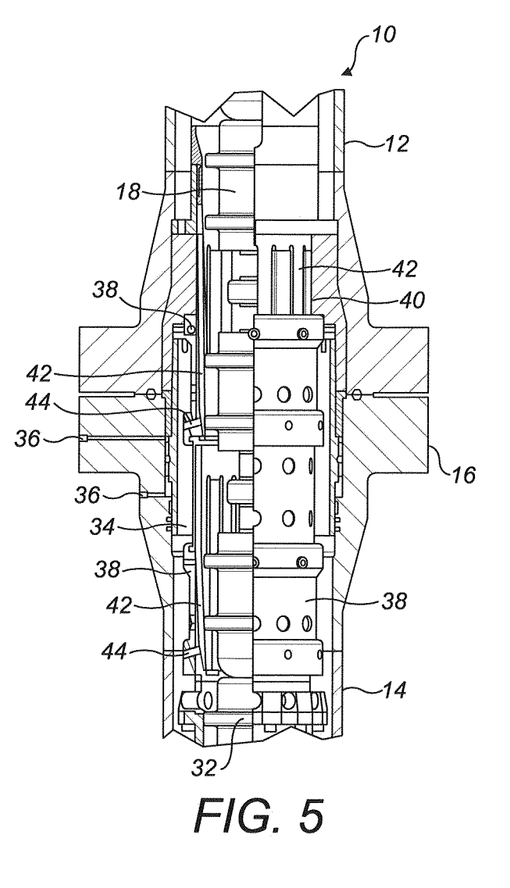
FIG. 5 is an enlarged detail view of the pig stopper mechanism corresponding to Detail V of FIG. 4.
Figure 6:
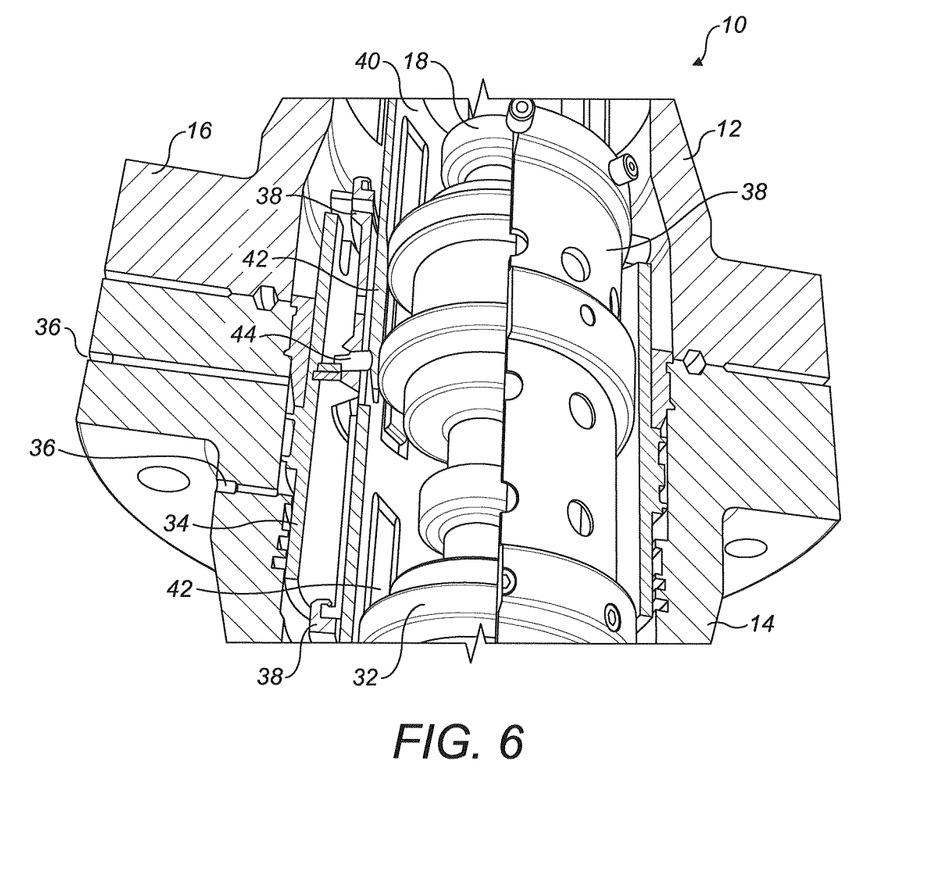
FIG. 6 corresponds to FIG. 3 but shows the pig stopper mechanism in the closed state.

Thus, when the slips piston 34 and the slips sleeve 38 move together upwardly against the direction of movement of the pigs 18 as shown in FIGS. 4 to 6, the cam formations 44 on the inside of the slips sleeve 38 act on the wedge surfaces of the fingers 42 to force the free ends of the fingers 42 to converge radially inwardly. Conversely, when the slips piston 34 and the slips sleeve 38 move together downwardly in the direction of movement of the pigs 18 as shown in FIGS. 1 to 3, the cam formations 44 slide down the wedge surfaces of the fingers 42 to allow the free ends of the fingers 42 to spring back radially outwardly by virtue of their resilience.

In this way, reciprocal movement of the slips piston 34 and hence of the slips sleeve 38 changes the effective internal diameter or lumen of the slips pipe 40 as defined by the radial positions of the free ends of the fingers 42. When the slips piston 34 and the slips sleeve 38 move against the direction of movement of the pigs 18 as shown in FIGS. 4 to 6, the free ends of the fingers 42 are forced radially together to restrict the lumen of the slips pipe 40. The free ends of the fingers 42 thereby engage the sealing discs 32 of the trailing pig 18 that is immediately behind the leading pig 18. This reliably prevents any pig 18 other than the leading pig 18 being launched inadvertently under fluid pressure introduced through the kicker line 26.

Figure 1:
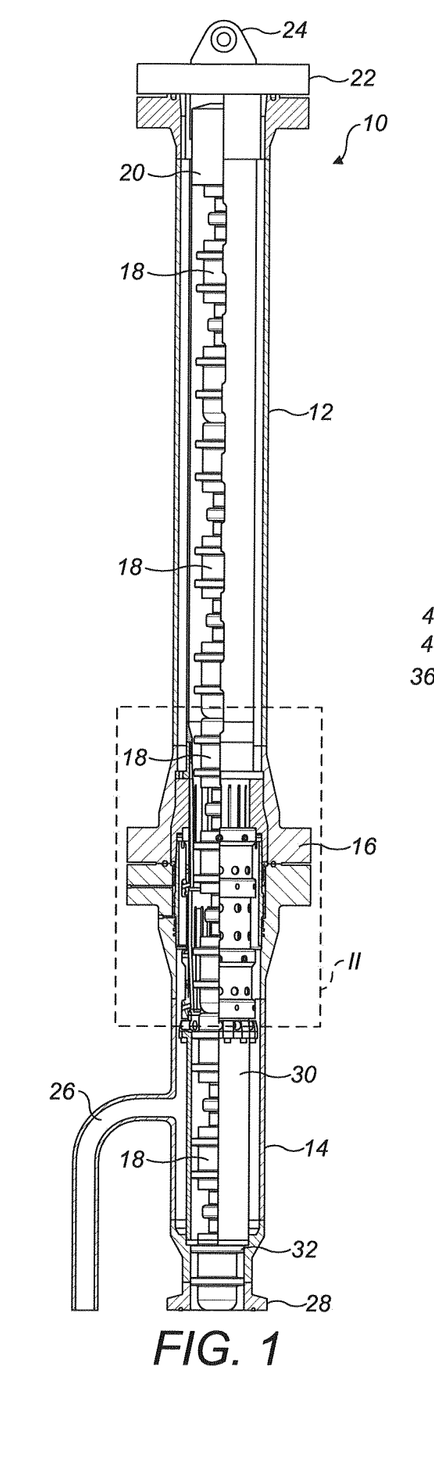
FIG. 1 is a side view in longitudinal section of a pig launcher in accordance with the invention, comprising a pig stopper mechanism shown in an open state.
Figure 2:
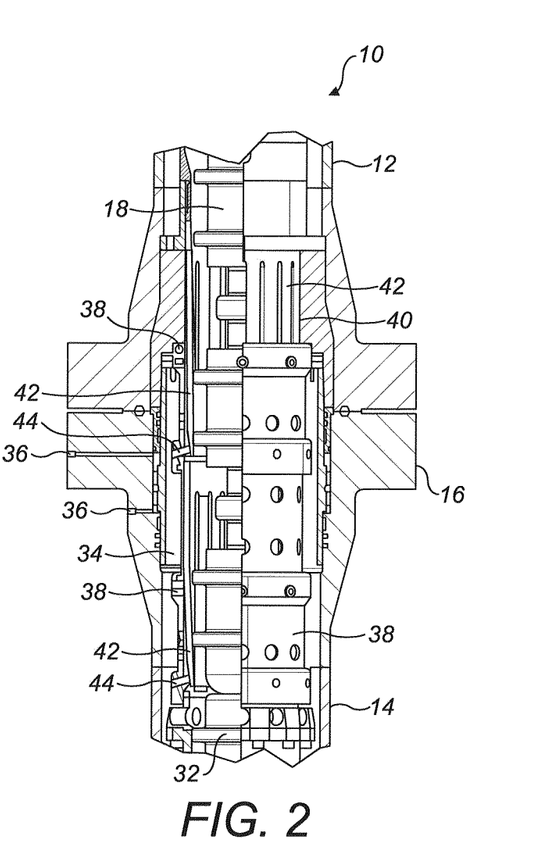
FIG. 2 is an enlarged detail view of the pig stopper mechanism corresponding to Detail II of FIG. 1.

When the leading pig 18 has been launched, the slips piston 34 and the slips sleeve 38 are driven to move in the direction of movement of the pigs 18 as shown in FIGS. 1 to 3. The free ends of the fingers 42 are now able to move radially apart to return the lumen of the slips pipe 40 substantially to its original diameter. The free ends of the fingers 42 thereby free the sealing discs 32 of the pig 18 that is within the slips pipe 40. This allows the pig 18 to advance into frictional engagement with the inner barrel 30, ready for the next launch operation.

Beneficially, the circumferential sets or arrays of fingers 42 and cam formations 44 are repeated at two or more longitudinally-spaced locations along the pig launcher 10 as shown. Thus, the slips pipe 40 has upper and lower arrays of fingers 42 and the slips sleeve 38 supports corresponding upper and lower arrays of cam formations 44. This allows the pig stopper mechanism to engage longitudinally-spaced sealing discs 32 of a pig 18 more effectively, hence improving the security of retention of the pig 18.

Advantageously, the slips piston 34 has the same area on both sides due to its tubular through-rod layout. This avoids a pressure rise inside the pig launcher 10 when the slips piston 34 is operated. Consequently, the operation of the slips piston 34 and the interaction with the slips pipe 40 should not be affected by either sudden or gradual changes of pressure within the pig launcher 10.

The sequence of loading and launching the pigs 18 will now be described. At the start, when the pig launcher 10 is empty, the fingers 42 of the slips pipe 40 are released as shown in FIGS. 1 to 3. Valves controlling fluid flow into the pig launcher 10 and the kicker line 26 are closed. The closure 22 is opened to afford access to the top of the upper barrel section 12.

Next, the leading pig 18 is lowered into the upper barrel section 12 until the sealing discs 32 of that pig 18 land on top of the inner barrel 30. The deadweight 20 is then lowered into the upper barrel section 12 to land on top of the leading pig 18. This advances the leading pig 18 against frictional resistance of the inner barrel 30 until the leading pig 18 contacts a ball of a pig launcher valve (not shown) positioned within the lower barrel section 14 in conventional fashion. The leading pig 18 is now in a correct position, ready for to launch.

The deadweight 20 is now removed from the pig launcher 10, allowing the second pig 18 to be lowered into the upper barrel section 12 until it lands on the top of the leading pig 18. The second pig 18 is thereby positioned inside the slips pipe 40. The remaining pigs 18 are then lowered successively into the upper barrel section 12, each to land on the immediately-preceding pig 18, until the required number of pigs 18 has been loaded into the pig launcher 10.

Finally, the deadweight 20 is lowered back into the upper barrel section 12 to land on top of the last pig 18. The closure 22 can then be reattached to the top of the upper barrel section 12. The pigs 18 are now all loaded and launching can start when required, beginning with the leading pig 18.

Thus, in a standby state before launching, the leading pig 18 is inside the inner barrel 30, the second pig 18 is positioned inside the slips pipe 40, and the slips defined by the fingers 42 are released as the slips piston 34 and the slips sleeve 38 are in bottom position. The upper barrel section 12 is full of pigs 18 and is closed at the top, and the deadweight 20 is in position on top of uppermost pig 18. The pig launcher valve and the kicker line valve are closed.

Immediately before launching the leading pig 18, the slips sleeve 38 is actuated by admitting hydraulic fluid into the cavity beneath the slips piston 34 to move the slips piston 34 up within the upper and lower barrel sections 12, 14. The resulting interaction of the cam formations 44 of the slips sleeve 38 with the upper and lower sets of fingers 42 of the slips pipe 40 causes the fingers 42 to move radially inwardly, gripping the sealing discs 32 of the second pig 18.

The pig launcher valve can now be opened, followed by the valve of the kicker line 26. In conventional fashion, the leading pig 18 is thereby propelled downwardly out of the pig launcher 10 by the fluid admitted through the kicker line 26. The pig launcher valve and the valve of the kicker line 26 are then closed again.

Next, it is necessary to advance the second pig 18 into the inner barrel 30 to become the next leading pig 18, ready for launch in a subsequent similar launch operation. This is achieved by actuating the slips sleeve 38 in the opposite direction by admitting hydraulic fluid into the cavity above the slips piston 34 to move the slips piston 34 down. This disengages the cam formations 44 of the slips sleeve 38 from the upper and lower sets of fingers 42 to allows the fingers 42 to release the second pig 18.

Consequently, with the fingers 42 in their open position, the weight of the deadweight 20 pushes all of the remaining pigs 18 downwardly. The pigs 18 will stop advancing when the nose of the lowest pig 18, hence now the new leading pig 18, makes contact with the ball of the pig launcher valve in the lower barrel section 14. The new leading pig 18 is now in the correct position for next pig launching operation.

At any time from now, the slips sleeve 38 may again be actuated by moving the slips piston 34 up to stop movement of the new second pig 18 that is now in the slips pipe 40.

However, if the next launching operation is not imminent, then this step can be delayed until just before that launching operation. This avoids the sealing discs 32 of the pig 18 being deformed by prolonged inward pressure from the fingers 42 of the slips pipe 40.

Many variations are possible within the inventive concept. For example, to accommodate more pigs, it would be possible for the upper barrel section 12 to be curved or to be replaced by a multi-barrel magazine. A multi-barrel magazine can be rotated or otherwise indexed to bring successive barrels into alignment with a launching mechanism.

The deadweight used as a pusher in the exemplary embodiment may be replaced by another pusher system that employs a piston or injection of high-pressure fluid acting behind the last of a series of pigs. Thus, it is not essential that the launcher is vertical or is oriented such that the leading or innermost pig is beneath the trailing or outermost pigs with respect to the access opening that leads to the pipeline.

The slips piston and the slips sleeve could be manufactured as the same part. Thus, for example, the cam formations could be mounted to or integral with the radially inner side of the slips piston. However, making the slips piston and the slips sleeve separately has the benefit of flexibility to adapt the launcher apparatus to handle pigs of different lengths or having different seal or guide configurations.

The invention claimed is:

1. A multiple pig launcher comprising a tubular structure along which a series of pipeline pigs may be advanced stepwise in a downstream direction to be launched into a pipeline in succession, the launcher comprising:
   a launching station arranged to hold a first pig at a downstream end of the series in readiness for launch;
   a holding station upstream of the launching station in the tubular structure; and
   a pig stopper mechanism that is operable selectively to hold a second pig at the holding station when launching the first pig and to release the second pig from the holding station to be advanced into the launching station after the first pig has been launched;
   wherein the pig stopper mechanism comprises at least one radially movable gripper element that is arranged to apply radially-inward gripping force to a pig held at the holding station and wherein the at least one gripper element is moveable radially inwardly by a camming action applied to it by an associated longitudinally moveable cam formation.

2. The pig launcher of claim 1, wherein the pig stopper mechanism is operable to reduce the internal diameter of the tubular structure at the holding station.

3. The pig launcher of claim 1, wherein the pig stopper mechanism comprises an angularly spaced array of gripper elements that surround the holding station.

4. The pig launcher of claim 1, wherein the at least one gripper element is fixed longitudinally with respect to the holding station.

5. The pig launcher of claim 1 and having a plurality of gripper elements spaced longitudinally with respect to each other along the holding station.

6. The pig launcher of claim 1, wherein the at least one gripper element is movable radially outwardly by resilience upon being released by the cam formation.

7. The pig launcher of claim 1 and having an angularly spaced array of the cam formations disposed around the tubular structure at the holding station.

8. The pig launcher of claim 1, wherein the at least one cam formation is supported for said longitudinal movement by a longitudinally movable actuator.

9. The pig launcher of claim 8, wherein the actuator is annular and surrounds the holding station.

10. The pig launcher of claim 8, wherein the actuator comprises a piston that is movable longitudinally along the tubular structure.

11. The pig launcher of claim 10, wherein the cam formations are supported by a sleeve that is fixed to the piston and that extends longitudinally beyond the piston.

12. The pig launcher of claim 1 and having a plurality of cam formations spaced longitudinally with respect to each other along the holding station.

13. The pig launcher of claim 1, wherein the at least one gripper element comprises a free end facing in the downstream direction, movable radially relative to an opposed radially fixed root end.

14. The pig launcher of claim 13, wherein the at least one gripper element comprises a finger supported by a pipe that extends along the holding station.

15. The pig launcher of claim 14, wherein the at least one finger is integral with the pipe and is defined by cut-outs that penetrate a wall of the pipe.

16. The pig launcher of claim 1, wherein the launching station is arranged to hold the first pig by frictional engagement.

17. The pig launcher of claim 16, wherein the launching station comprises a tube that tapers internally in the downstream direction.

18. The pig launcher of claim 1, further comprising a pusher arranged to apply force in the downstream direction to a pig at an upstream end of the series to advance the at least one remaining pig in the downstream direction after the first pig has been launched.

19. The pig launcher of claim 18, wherein the pusher comprises a deadweight that is movable under its weight along the tubular structure.

20. The pig launcher of claim 18, wherein the pusher comprises a piston or a fluid injection system.

21. The pig launcher of claim 1, further comprising a pig magazine upstream of, and communicating with, the holding station.

22. The pig launcher of claim 1, when containing at least one pig.

23. The pig launcher of claim 22, wherein the launching station comprises a tube whose internal diameter is less than an external diameter of the at least one pig in the launcher.

24. The pig launcher of claim 22, wherein the pusher comprises a deadweight that is movable under its weight along the tubular structure and the deadweight bears down upon an upstream end of the at least one pig in the launcher.

25. The pig launcher of claim 22, wherein the pig stopper mechanism is arranged simultaneously to engage at least two successive sealing discs along the length of the at least one pig in the launcher.

26. A method of launching a series of pipeline pigs into a pipeline in succession, the method comprising:
   holding a first pig at a downstream end of the series at a launch position in readiness for launch wherein the first pig is held by a frictional engagement that is overcome, on launch, by kicker fluid pressure;
   generating a radially-inward gripping force by moving an actuator longitudinally with respect to a second pig of the series immediately upstream of the first pig; and
   by selective application and release of said radially-inward gripping force, holding the second pig when launching the first pig and then releasing the second pig to be advanced into the launch position after the first pig has been launched.

27. The method of claim 26, comprising advancing the second pig, when released, by applying pusher force behind the second pig.

28. The method of claim 26, comprising applying said gripping force to the second pig in response to a command to launch the first pig.

29. The method of claim 26, comprising applying said gripping force to the second pig from at least two mutually opposed radial directions.

30. The method of claim 26, comprising applying said gripping force to the second pig at two or more locations spaced along the pig.

31. The method of claim 26, comprising advancing the second pig, when released, through the actuator.

\* \* \* \* \*